United States Patent [19]

Bronson, Jr. et al.

[11] 4,090,835
[45] May 23, 1978

[54] APPARATUS FOR APPLYING AN ELASTOMERIC EDGE TO A SHEET OF ELASTOMERIC FABRIC

[75] Inventors: Wright Bronson, Jr., Akron; Thomas Ashworth, Jr., Stow; Ralph Frederick Kiemer; Gail William Hausch, both of Akron, all of Ohio

[73] Assignee: The Steelastic Company, Akron, Ohio

[21] Appl. No.: 723,197

[22] Filed: Sep. 14, 1976

Related U.S. Application Data

[63] Continuation-in-part of Ser. No. 691,636, Jun. 1, 1976, abandoned.

[51] Int. Cl.² .................................................. B29C 17/02
[52] U.S. Cl. ...................................... 425/505; 264/171; 264/252; 425/516; 425/517; 425/113; 425/190; 425/380
[58] Field of Search ............... 264/171, 252, 259, 174, 264/209; 156/500, 501, 244; 425/110, 113, 114, 112, 505, 508, 511, 516, 374, 190, 517, 383, 380, 467, 385

[56] References Cited

U.S. PATENT DOCUMENTS

| 3,477,891 | 11/1969 | Hawerkamp | 156/244 X |
| 3,491,176 | 1/1970 | Wahlstrom | 425/113 X |
| 3,524,781 | 8/1970 | Winterroth et al. | 156/244 X |
| 3,837,771 | 9/1974 | Kolakowski et al. | 425/374 X |
| 3,843,438 | 10/1974 | Gabriel | 264/209 X |
| 3,869,240 | 3/1975 | Mackie et al. | 425/374 |
| 3,956,056 | 5/1976 | Boguslawski et al. | 425/113 X |
| 3,994,643 | 11/1976 | Joslin et al. | 425/110 |

Primary Examiner—Francis S. Husar
Assistant Examiner—Mark Rosenbaum
Attorney, Agent, or Firm—Hamilton, Renner & Kenner

[57] ABSTRACT

The present invention relates to apparatus for edging reinforced elastomeric fabric and a preferred method for the operation thereof. One embodiment of apparatus includes a frame, a table for support of the elastomeric fabric, at least one extruder assembly adjacent the table for the application of a suitable elastomeric material directly onto an edge of the elastomeric fabric and means for moving the elastomeric fabric over the table. In an alternate embodiment, the apparatus includes a frame, means for support of the elastomeric fabric and at least one extruder assembly adjacent the means for support for the application of a suitable elastomeric material directly onto an edge of the elastomeric fabric. The preferred method includes the steps of passing the elastomeric fabric over the means for support, extruding the elastomeric material through the head and imparting a first edge therein compatible with an edge of the elastomeric fabric and joining the extruded material to an edge of the elastomeric fabric by forcing the material into substantially all of the exposed surfaces thereof.

5 Claims, 11 Drawing Figures

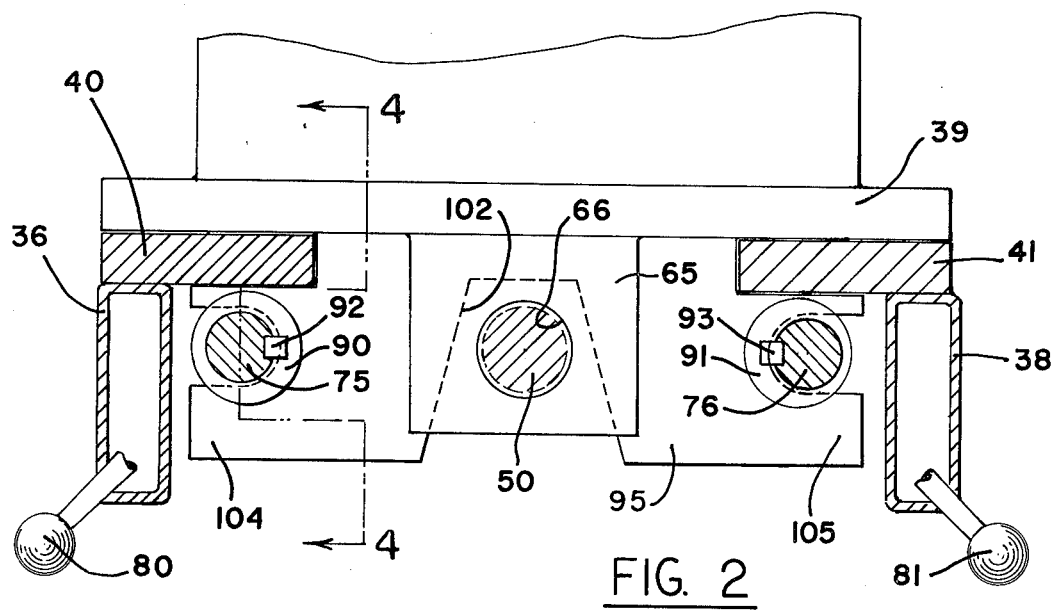
FIG. 2
FIG. 3
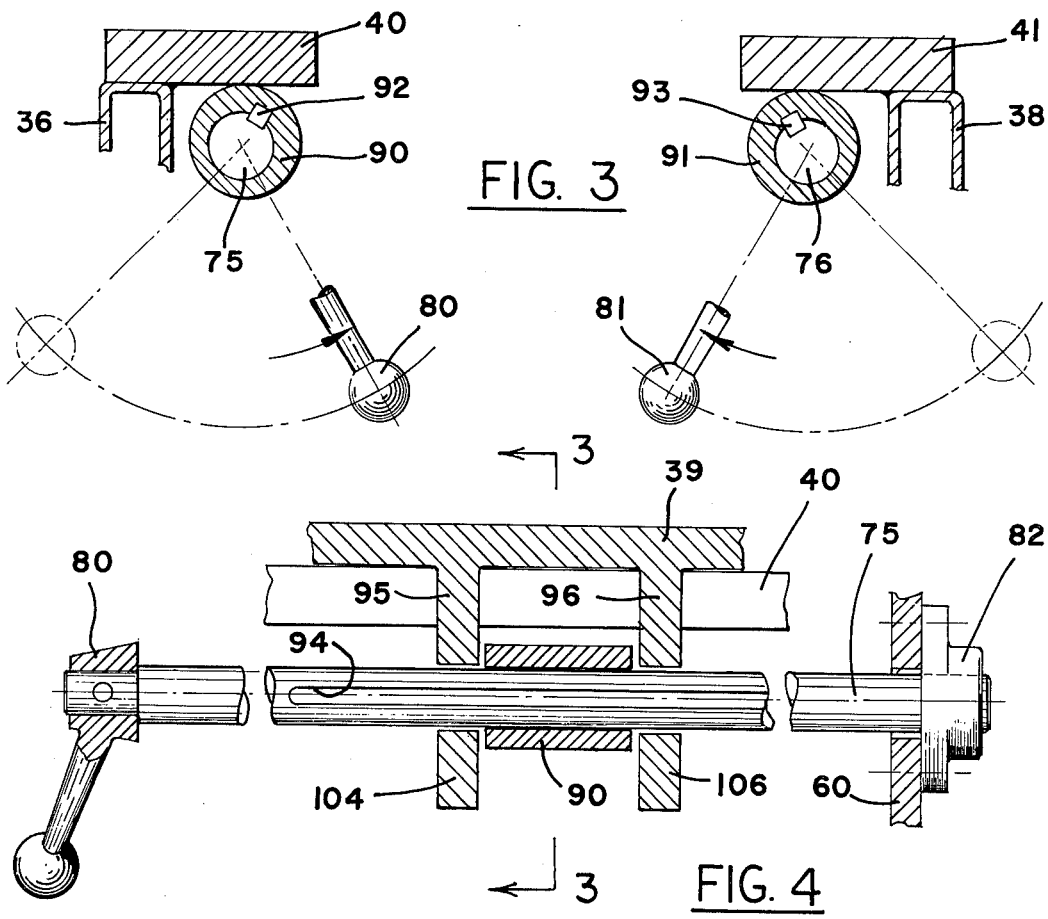
FIG. 4

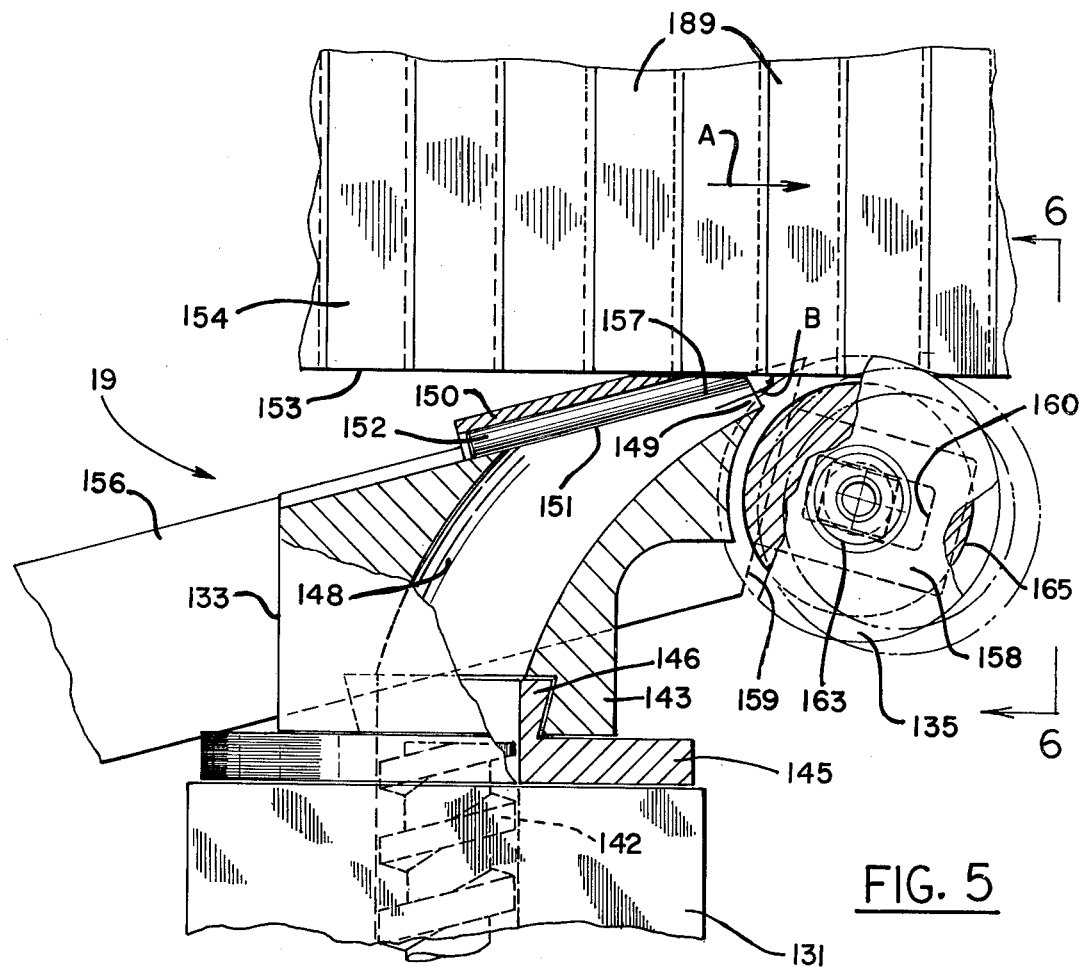
FIG. 5
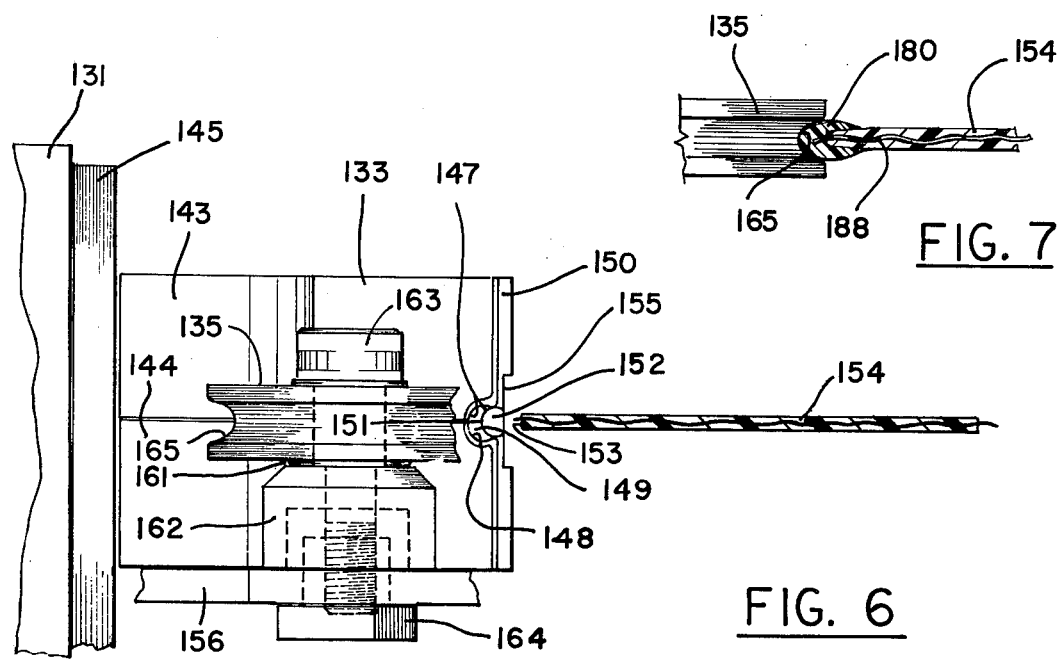
FIG. 7
FIG. 6

APPARATUS FOR APPLYING AN ELASTOMERIC EDGE TO A SHEET OF ELASTOMERIC FABRIC

CROSS REFERENCE TO RELATED APPLICATION

This application is a continuation-in-part of U.S. Patent Appln. Ser. No. 691,636, filed June 1, 1976, now abandoned.

BACKGROUND OF THE INVENTION

The present invention is directed toward apparatus for edging reinforced elastomeric stock, hereinafter referred to as a gum edger. With the exception of modern, cast elastomer technology, which does not require reinforcement, it has been well recognized that conventionally employed elastomeric stocks, e.g., rubber, do not possess the inherent strength either to maintain their integrity during the processing steps necessary to obtain the desired article or ultimately to function as an acceptable product when subjected to normal use. Thus, the elastomers have been reinforced in sheet form, generally referred to as reinforced elastomeric fabric, by the inclusion of embedded fibers, mono or polyfilament, which are considerably less extensible than the elastomer. These filaments, or reinforcing cords, include materials such as cotton, synthetics such as rayon, nylon, aramid, polyamides and polyesters, fiberglass and metallic wire, particularly steel, either single strand or cabled.

Calendering has been the historic way in which to make reinforced elastomeric fabric, especially for tire plies. When the elastomer is calendered the reinforcing cords are oriented parallel to the length of the sheet emanating from the calender. As such, in order for the reinforcing cords to be angularly or perpendicularly inclined with respect to a circumferential reference plane when the reinforced elastomeric fabric is incorporated in a tire, it is necessary to cut it either on the bias, or perpendicular to the longitudinal strands of reinforcement.

A more recently developed apparatus for making reinforced elastomeric fabric involves the manufacture of a relatively narrow reinforced ribbon which is cut into strips of predetermined length which strips are subsequently joined and may be stitched together to form the fabric in desired widths wherein the strands of reinforcement are oriented angularly or perpendicularly to the length of the fabric. Suitable apparatus for making fabric in this manner is described in U.S. Pat. No. 3,803,965 and U.S. Ser. No. 676,903, owned by our comon assignee, The Steelastic Company.

Irrespective of the apparatus and method employed, i.e., calendering or assembly of strips of reinforced ribbon, when the reinforcing filaments are metallic, it has been recognized that the exposed ends of reinforcement along the cut edges of the reinforced elastomeric fabric cause an adverse effect upon the products, most particularly radial or bias tires, within which they are incorporated. Metallic reinforcing generally employed is steel wire either monofilament or cabled and tire manufacturers have long striven to obtain good adhesion between the elastomer and embedded metallic reinforcement by incorporating certain rubber soluble cobalt containing salts within the elastomer. Although the wire is plated or coated with brass to resist rusting or an adhesive for enhancement of adhesion, where the wire has been severed, an exposed surface is presented which immediately begins to oxidize upon contact with the atmosphere. While adhesion between chemically clean steel and some elastomers may be acceptable, such oxidation is to be avoided inasmuch as the elastomeric material in which the wire is embedded does not adhere to the wire as it becomes oxidized.

In the manufacture of steel belted bias and radial tires, one or more circumferentially oriented belts are located beneath the tread stock to maintain the integrity and shape of the tire during inflation and subsequent load. The steel reinforcement in these belts is commonly disposed at an angle from the length of the belt, and subsequently with respect to a plane perpendicular to the rotational axis of the tire, and thus, when the belt is constructed, all of the severed ends of steel reinforcement are exposed along both sides of the belt. In addition to making such belts difficult to handle by the worker, oxidation of these exposed ends before the belt can be incorporated in a tire, gives rise to subsequent belt edge separation in the tire.

Belt edge separation is a condition which presently accounts for not only a majority of failure of radial passenger, truck and off-the-road tires but also, for the decrease in tires acceptable for retreading. During use of the tire for distances often exceeding 50,000 to 100,000 miles (80,500 to 161,000 km), these once exposed ends of reinforcement, now surrounded by underlying carcass plies and overlying tread, fail to adhere to the elastomer. With constant flexing and extension of the elastomeric material as well as the steel reinforcement, attendant use of the tire, the edges of the belt eventually break loose from the carcass plies in the region of the shoulder of the tire. Although the condition once started is not curable, if it is not detected or if it be ignored and the tire is not replaced, failure of the tire results by either partial or total separation of the tread from the body of the tire during high speed continued operation.

The latter result is highly intolerable on the highway and has been experienced in this country an appreciable extent on passenger car tires, as well as in other countries where upper speed limits are not posted it is not uncommon for speeds of 100 mph (161 kmph) to be driven for several hours, precipitating such failure with a high probability of disasterous results. While such use of tires may not be expected in this country, that fact alone does not obviate the need to eliminate belt edge separation in steel belted radial tires.

Oxidation of the exposed ends of the steel wire reinforcing may be minimized by incorporating the fabric into the tire soon after it has been made or, by carefully controlling the environment surrounding the fabric prior to its intended use. However, such efforts are rarely practical and the fabric is often stored for a time of from several days to perhaps several months in a warehouse prior to its use and it is during this period that oxidation of the exposed wire reinforcement occurs.

One method developed and employed to eliminate oxidation of the exposed wires is to calender a sheet of a suitable elastomer from which strips may be cut, to be applied to the exposed edges of the reinforced elastomeric fabric, e.g., carcass ply or tread belts. Such strips, referred to as cushion gum, have been relatively wide, e.g., 3.75–5.0 cm wide and approximately 0.038 cm thick, are applied to one side of the edge of the fabric, subsequently folded over onto the other side and are then stitched thereto. However, when the cushion gum is folded over the edge of the fabric, alignment as well as handling is difficult due to the inherent tack of both surfaces, fabric and gum, and inevitably results in an air pocket at the edge where, first, the desired adhesion between steel and elastomer is not obtained and, secondly, wherein oxidation is neither abated nor precluded.

Adhesion-enhancing additive materials are most feasibly employed in cushion gum which is to be applied immediately after the wire shearing operation which provides a chemically clean steel surface for a short period of time. Although this cushion gum is, however, often applied to the belts at the time of tire construction, after the fabric may have been stored for a time sufficient for oxidation of the exposed wire ends to have occurred, failure of the belts in tires so constructed has been found, nevertheless, to be significantly reduced. However, the treatment is not without its faults, which are increased costs in both labor and materials; increased thickness of the ply at the edges; and, the presence of air pockets in the area of the gummed edges which permit oxidation. Moreover, work with the application of various elastomers has demonstrated that the more suitable compounds cannot be calendered into thin strips for subsequent gum edging. Despite many attempts by the industry, gum edging remains a costly, time-consuming process and the disparity between these facts and the benefits gained by the employment of the process remains great enough to limit gum edging to only steel reinforced elastomeric belts for radial truck tires. Considering the benefits in terms of longer tire life and safety, it becomes highly desirable to employ the process of gum edging for all tire manufacture, commerical, e.g., truck tire and off-the-road, and passenger.

Another problem inherent in tires is their adverse effect to internal discontinuities, such as regions where hinge points exist. Hinge points frequently coincide with abrupt endings of the fabric, e.g., endings of the ply turn-ups, endings of break and shock plies, and of belt edges. The recent trend toward reducing tire plies, i.e., 2-ply and 1-ply (radial) passenger car tires in lieu of 4-ply, and 4-ply, 6-ply and 1-ply (radial) in lieu of 12-ply for many of the truck tire sizes, has been greatly facilitated by the use of cord reinforcement of greater diameter, e.g., 1260/3 rather than 840/2, with a consequent increase in the gauge of the elastomeric fabric which, in turn, has contributed significantly to the development of hinge points.

The problem is particularly apparent in the construction of a typical truck tire wherein several plies are cut to a common width and then offset to provide a step-off. When the plies are turned up about the bead region, one side has an exposed step-off and the other side has a buried step-off. Ply endings in the turn-up region not only lead to the possibility of air entrapment, but also, ply distortion in the case of buried turn-ups and an abrupt change in bending stiffness. The overlying ply must make a sharp bend over the buried and exposed step-offs creating a hinge point and tending to trap air. While gum strips may be applied to cover the terminal regions of the plies, and to provide elastomer to flow, the disadvantages are increased cost, a tendency to entrap air and the creation of another edge.

Another ply construction very sensitive to the abrupt ending of the fabric is the buried shock ply—a partial width ply placed within the body of the tire, extending from mid-sidewall to mid-sidewall and lying between the second and third plies. The ends of such plies create a possibility for distortion, air entrapment and hinge points. The application of a gum strip may provide sufficient elastomer to flow for the elimination of some distortion but, in and of itself, provides another discontinuity.

Again, gum edging could be the solution to the elimination of abrupt termination of the plies with a suitable apparatus and method for the application of an elastomer in a configuration and quantity which would facilitate a transition substantially free from distortion between ply endings and overlying plies.

SUMMARY OF THE INVENTION

It is, therefore, an object of the present invention to provide an apparatus for edging reinforced elastomeric fabric.

It is a further object of the present invention to edge the fabric in a manner which eliminates oxidation of exposed steel reinforcement.

It is another object of the present invention to edge the fabric in a manner which eliminates entrapment of air between the elastomer and the edge to which it is applied and facilitates maximum adhesion between contiguous elastomeric surfaces and with any suitable reinforcement filaments.

It is yet another object of the present invention to edge the fabric in a manner which substantially eliminates abrupt termination of plies which are subsequently employed in the manufacture of reinforced elastomeric articles, particularly tires.

It is a further object of the present invention to provide an apparatus for edging reinforcing belts for bias and radial tires in a manner which substantially eliminates belt edge separation in the tire during its life.

It is still a further object of the present invention to provide an apparatus for edging reinforced elastomeric fabric which will facilitate the manufacture of new tires and the retreading of used tires of improved quality.

It is still another object of the present invention to edge the fabric with more suitable elastomeric compositions than have been employed via conventional gum edging techniques; to edge in a less costly manner; and to control the quantity and profile of the edge being applied.

These and other objects, together with the advantages thereof over existing and prior art forms, which shall become apparent from the specification which follows are accomplished by means hereinafter described and claimed.

In general, apparatus embodying the concept of the present invention includes a frame, a table for support of the reinforced elastomeric fabric, at least one extruder assembly adjacent the table for the application of a suitable elastomeric material directly onto an edge of the elastomeric fabric and means for moving the elastomeric fabric over the table. An alternate embodiment includes a frame, means for support of the elastomeric fabric and at least one extruder assembly adjacent the means for support for the application of a suitable elastomeric material directly onto an edge of the elastomeric fabric. The preferred method for applying elastomeric material to an edge of reinforced elastomeric fabric includes the steps of passing the elastomeric fabric over the means for support, extruding the elastomeric material through a head and imparting a first edge therein compatible with an edge of the elastomeric fabric, and joining the extruded material to an edge of the elastomeric fabric by forcing the material into substantially all of the exposed surfaces thereof. The invention further provides for a second extruder assembly which, in conjunction with the first, applies the elastomeric material to opposed edges of the elastomeric fabric passing therebetween.

DESCRIPTION OF THE DRAWINGS

FIG. 2 is a side elevation of a portion of the apparatus, partially in section, depicting the braking mechanism for one of two movable extruder assemblies;

FIG. 3 is a partial horizontal cross section taken substantially along line 3—3 of FIG. 4;

FIG. 4 is a partial vertical cross section taken substantially along line 4—4 of FIG. 2;

FIG. 5 is a top plan, partially in section, of one of the extruder heads;

FIG. 6 is a frontal elevation of the extruder head and a cross section of reinforced elastomeric fabric in position for receiving a gum edge;

FIG. 7 is a view similar to FIG. 6 depicting the deposit and preliminary shaping of a gum edge along one edge of elastomeric fabric;

DESCRIPTION OF THE PREFERRED EMBODIMENT

Figure 1:
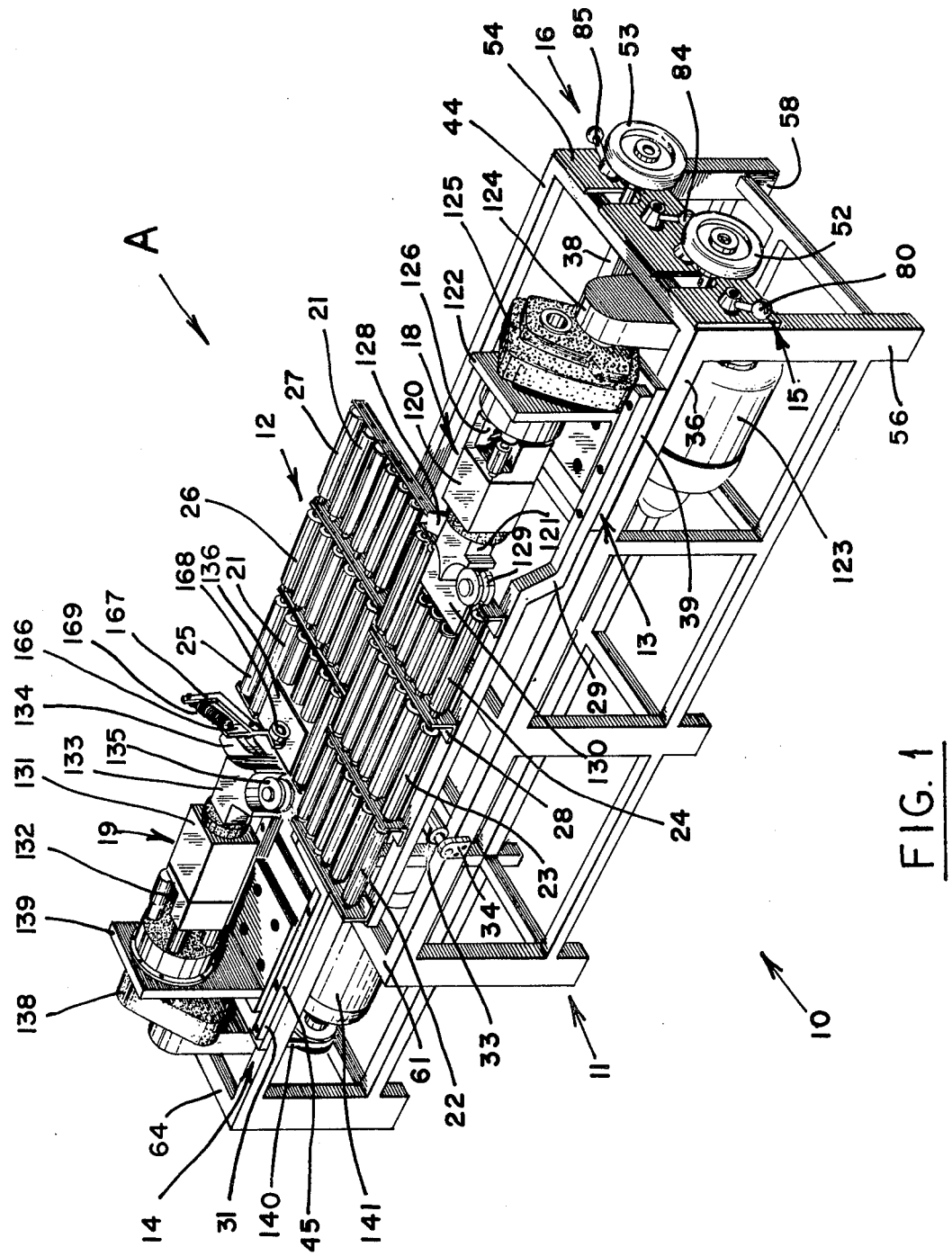
FIG. 1 is a perspective view of an apparatus for edging sheets of reinforced elastomeric fabric embodying the concept of the present invention and operative according to the method thereof; a portion of the apparatus responsible for moving the fabric therethrough having been removed for clarity.

The improved apparatus for applying a gum edge to sheets of reinforced elastomeric fabric and embodying the concept of the present invention, is generally designated by the numeral 10 on the attached drawings. The apparatus 10 has a rigid base frame 11 from which is supported the primary mechanisms, i.e., a support table 12, inboard and outboard carriage assemblies, 13 and 14 respectively, inboard and outboard braking mechanisms, 15 and 16 respectively, inboard and outboard extruder assemblies, 18 and 19 respectively, and a drawing mechanism 20.

The operation of the subject apparatus shall be discussed in detail following description of the components thereof. Before proceeding, however, it may be helpful to state that the apparatus 10 is capable of applying a gum edge to opposite sides of a sheet of reinforced elastomeric fabric (FIG. 5) passing therethrough in the direction of the arrow A. The fabric may have been calendered in a conventional manner or prepared on an apparatus, such as is described in U.S. Pat. No. 3,803,965 or U.S. Ser. No. 676,903 both of which are owned by our common assignee, The Steelastic Company, and may, of course, be reinforced with any of the conventionally employed filaments.

Returning now to the description, the support table 12 includes a plurality of individual conveyor rollers 21 carried in six banks 22–27, each of which includes angle brackets 28 for support of the rollers 21.

Figure 8:
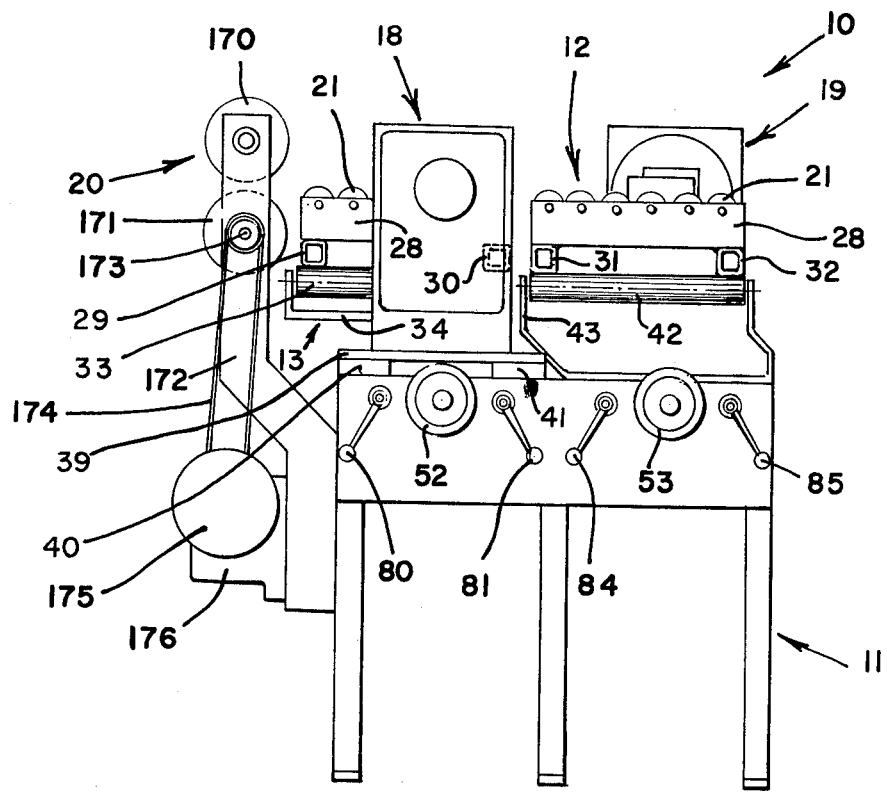
FIG. 8 is a side elevation of the complete apparatus, depicting the drawing mechanism.
Figure 10:
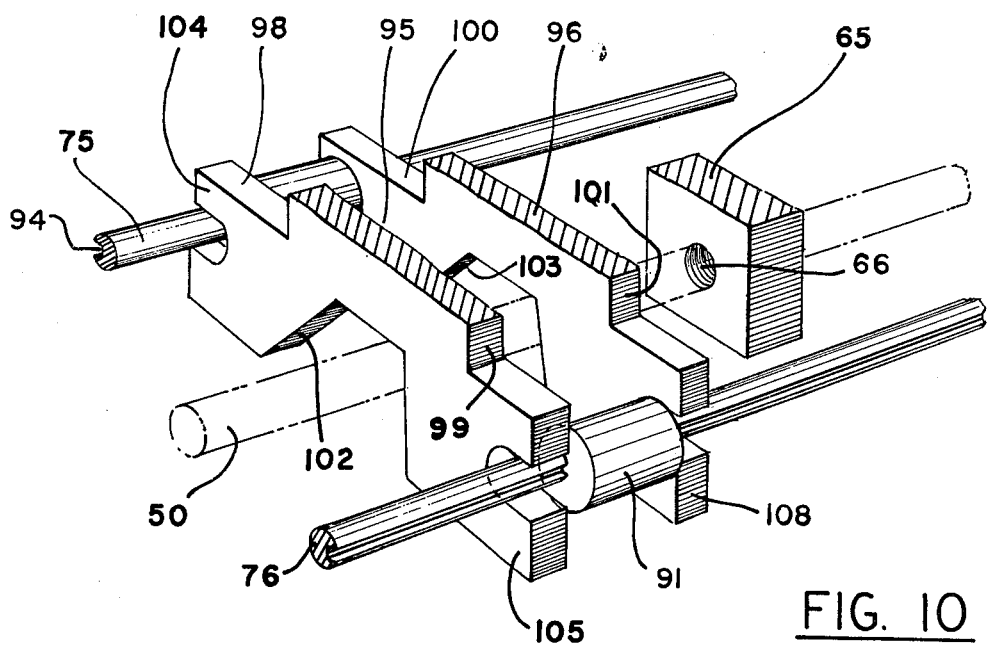
FIG. 10 is a schematic perspective of the braking mechanism.

The roller banks 22–24 are mounted on carriage assembly 13 which includes two parallel roller frames 29 and 30. Similarly, the roller banks 25–27 are mounted on carriage assembly 14 which includes parallel roller frames 31 and 32 (FIG. 8). The roller frames 29 and 30 of carriage assembly 13 are supported at one end by a roller 33 mounted in a suitable bracket 34 affixed to horizontal frame members 36 and 38 forming the upper surface of frame 11. At their opposite end, the roller frames 29 and 30 are bolted to a cross plate 39 which rests upon and moves over bedplates 40 and 41 carried directly by frame members 36 and 38. In similar fashion, the roller frames 31 and 32 are supported at one end by a roller 42 (FIG. 8) mounted in a bracket 43 affixed to horizontal frame members 38 and 44, respectively, of frame 11. At the opposite end, roller frames 31 and 32 are bolted to a cross plate 45 resting upon and movable over bedplates 46 and 48 carried by horizontal frame members 38 and 44.

Figure 9:
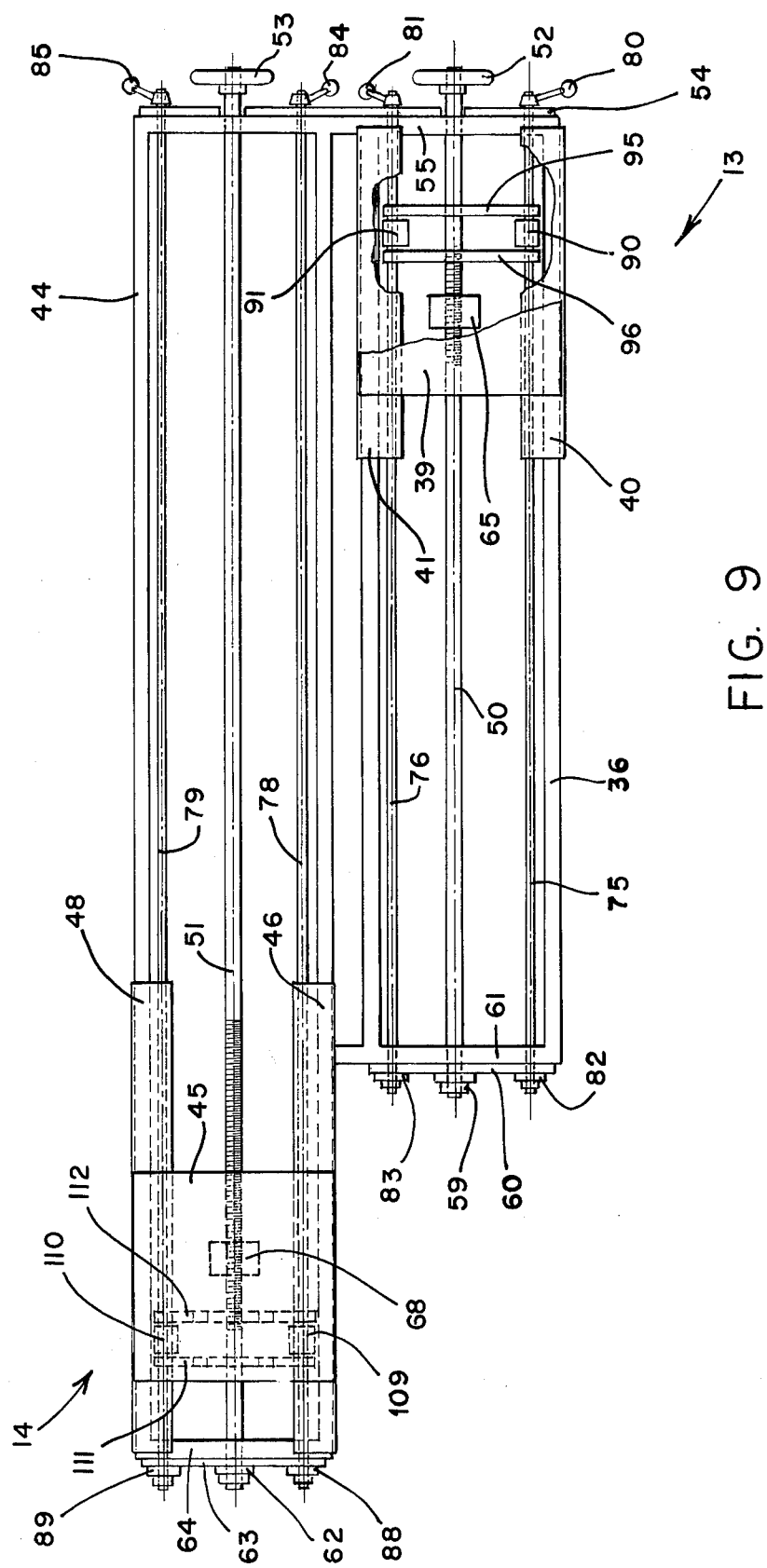
FIG. 9 is a top plan of the apparatus wherein the support table, extruder assemblies and a portion of the carriage assemblies have been removed to present details of the braking mechanisms and the carriage shafts.

The carriage assemblies 13 and 14 further include shafts 50 and 51 provided with handwheels 52 and 53, respectively. Shaft 50 passes through an end plate 54 affixed to end frame member 55 and legs 56 and 58 of frame 11, at one end, and is journaled at its opposite end in a suitable bearing 59 (FIG. 9) carried by an end plate 60 affixed to end frame member 61. Shaft 51, for carriage assembly 14 is similarly journaled in a bearing 62 carried by an end plate 63 affixed to end frame member 64 at one end, and passes through end plate 54 as does the shaft 50.

At least a portion of shaft 50 is threaded and engages a block 65 having a threaded aperture 66 and welded to the underside of cross plate 39 (FIG. 2). Shaft 51 threadably engages a block 68 welded to the underside of cross plate 45 and thus, rotation of handwheels 52 and 53 reciprocates the cross plates 39 and 45, respectively, of carriage assemblies 13 and 14 along the bedplates 40, 41, 46 and 48. As depicted in the drawings, the carriage assembly 13 and roller banks 22–24 can move toward and away from carriage assembly 14 a short distance of approximately 1–2 inches (2.5–5.0 cm) while reciprocal movement of carriage 14 and roller banks 25–27 with respect to carriage assembly 13 is greater, e.g., approximately 30 inches (75 cm). Thus, the width of the table 12 can be varied to accommodate many different sized elastomeric fabrics from the relatively narrow belt plies to the wider body plies. Carriage assembly 14 can be quickly positioned to an approximate width and subsequent fine adjustments can be made by movement of carriage assembly 13.

The braking mechanisms 15 and 16 are functionally identical and include twin shafts 75–76 and 78–79. The shafts 75 and 76 are associated with the carriage assembly 13 and pass through end plate 54 on either side of carriage shaft 50. Handles 80 and 81 are provided to turn the brake shafts for locking and/or releasing the carriage cross plate 39. The brake shafts extend parallel with carriage shaft 50, through end plate 60, and are held in suitable bearing assemblies 82 and 83. Shafts 78 and 79, associated with carriage assembly 14, pass through end plates 54 and 63 having handles 84 and 85 at plate 54 and are held at plate 63 in bearings 88 and 89.

With specific reference to FIGS. 2–4 and 10, the detail and operation of braking mechanism 15 can best be explained. The brake shafts 75 and 76 are each provided with a cam 90 and 91, respectively, nonrotatably affixed thereto via keys 92 and 93. The shaft 75 has an elongated keyway 94 having a length at least as great as the extent of travel permitted carriage assembly 13. Twin guide plates 95 and 96 are affixed to the underside of cross plate 39. Plate 95 has notches 98 and 99 as does plate 96 at 100 and 101 which receive the inner sides of bedplates 40 and 41, functioning to maintain cross plate 39 in alignment as it is reciprocated. The central portion of each plate is bridged as at 102 and 103 to form a passageway for carriage shaft 50.

Beneath the notch 98 the guide plate 95 carries a yoke 104 through which the brake shaft 75 passes. A second yoke 105 beneath the notch 99 receives the brake shaft 76. Yokes 106 and 108 are also provided in guide plate 96 to receive the shafts 75 and 76, respectively. As clearly depicted in FIG. 4 the cam 90 on brake shaft 75 cannot pass beyond either yoke 104 or 106. When movement of the carriage 13 is desired, the brake shaft and handles 80 and 81 are positioned as in FIG. 2 and it is seen that cams 90 and 91 are spaced from overlying bedplates 40 and 41. By rotating the handles 80 and 81, as depicted in FIG. 3, the cams 90 and 91 are brought into engagement with the bedplates 40 and 41 thereby prohibiting further movement of the carriage 13. So long as the cams do not engage the bedplates, the cams are slid along their respective brake shafts by one of the yokes provided in the twin guide plates.

Beneath carriage assembly 14, the shafts 78 and 79 of braking mechanism 16 are also provided with cams 109 and 110, respectively, which are positioned between twin guide plates 111 and 112 carried by cross plate 45. Details of the braking mechanism 16 are structurally identical with those described in conjunction with braking mechanism 15 and shall, therefore, not be repeated.

The extruder assembly 18 includes an extruder 120 and extruder head 121 carried by an angle bracket 122 affixed to cross plate 39. The extruder 120 is driven by a motor 123 carried by another angle bracket (not shown) affixed to the underside of cross plate 39. A belt, behind guard 124 transmits power from the motor 123 to a speed reduction unit 125 also carried by angle bracket 122. The extruder 120 may be heated in any conventional manner and has a feed port 126 through which the elastomer, forming the gum edge, is fed. A separate electric heat element 128 is connected at one side of the head 121 and a special forming wheel 129 is rotatably and movably affixed at the opposite side thereof, the purpose of which shall be described hereinbelow. A smooth plate 130 is provided in roller bank 24 and may be raised or lowered in order to accommodate different thicknesses of elastomeric fabric passing before the extruder head 121 and forming wheel 129. The entire extruder assembly is carried by and movable with carriage assembly 13.

Similarly, the extruder assembly 19 includes an extruder 131, feed port 132, extruder head 133, heat element 134, forming wheel 135 and smooth plate 136. The extruder 131 and a speed reduction unit 138 are carried by an angle bracket 139, affixed to cross plate 45, and are driven via power belt 140 from a motor 141 carried by a bracket mounted on the underside of cross plate 45. The entire assembly is movable with carriage assembly 14.

A more detailed description of the extruder mechanism 19 may be made with reference to FIGS. 5–7. The elastomer to be extruded is fed via extruder screw 142 to the head 133 which comprises upper and lower halves, 143 and 144, respectively, which are connected via machine screws not shown. Preferably, the bottom half is connected to a mounting flange 145 which is itself readily attached to the end of the extruder 131 with screws not shown. The top half 143 is then connected to the bottom which facilitates cleaning of the head 133 when the apparatus is not being used.

A conical flange 146 extends from the mounting flange 145 through which the extrudate passes into the head 133. Each half of the extruder head has a tapered, generally semicylindrical throat 147 and 148 narrowing to an outlet port 149 through which the elastomer is forced into a predetermined shape, e.g., circular, as depicted in FIG. 6. At the entrance of the throat, each half is machined to fit over the conical flange 146. This design allows a locking seal to be formed between the halves 143 and 144, and of each with the mounting flange 145. During operation of the extruder 131, the extrudate is forced through the flanges 145 and 146 and into the throat. Any tendency of the halves 143 or 144 to draw away from the flange, when under pressure, is checked by the locking engagement between the inclined surfaces of the flange 146 and the mating, machined surfaces of the head. Again, cleaning is not hampered, inasmuch as the upper half is readily removable, vertically, from the lower half.

A removable edge-forming plate 150 is fastened to the halves 143 and 144 with screws and is provided with a protruding edge 151 which forms a first edge in the elastomeric material which is compatible with the edge of the elastomeric fabric to be covered. The edge 151 which may have any desirable shape, comprises, as shown, a small diameter metal rod 152, one side of which serves to close the outlet of the extruder head down to the narrow outlet port 149. By employing a cylindrical rod 152, in the manner described, a thin ribbon of generally C-shaped cross section (FIG. 6) is extruded, which has been found to be particularly adaptable to the edge 153 of the reinforced elastomeric fabric 154 which is to be covered. Finally, it will be noted that a flat recess at 155 has been ground in the forming plate 150 and a portion of the rod 152. As seen in FIG. 5, the recess acts as a guide for the fabric 154 and is generally employed in the positioning of the extruder assemblies with respect to the fabric for the application of the gum edge. A slight clearance between the rod 152 and the fabric 154 may be maintained when the reinforcement filaments are metallic in order to prevent premature wear of the rod 152.

The end 157 of rod 152 extends along the outlet 149 a distance sufficient to cause the extrudate to turn away from the forming wheel 135 and directly toward the fabric edge 153, the flow being indicated by the arrow B in FIG. 5. The turning of the extrudate in this manner helps significantly to force it into the fabric edge, between all of the reinforcing filaments therein, without entrapment of micro air pockets.

At the underside of the lower half 144 of head 133 an elongated flat plate 156 is attached which extends the length of the head and a distance rearwardly thereof upon which the extruder head heat element 134 is carried which provides heat to the interior of the head 133. A short forwardly extending foot 158 is welded to the leading edge 159 of plate 156 which carries a longitudinally extending slot 160. The foot 158 is provided for support of the forming wheel 135 which rests upon a washer 161 and spacer 162. A bolt 163 passes through a bore in the wheel 135 washer and spacer and slot 160 and is connected to a T-shaped nut 164. Movement of the wheel 135 away from the extruder head outlet 149, along the slot 160, effectively increases the space between the forming edge 165 of wheel 135 and the edge of the fabric, as depicted in phantom in FIG. 5.

The flat plate 156 also serves as a mount for an arm 166 which pivotally carries a lever 167 (FIG. 1). At one end of the lever 167 is mounted a rotatable wheel 168 which engages the reinforced fabric drawn between it and the smooth plate 136. A tension spring 169 affixed to the other end of lever 167 and to the arm 166 urges the wheel 168 downwardly against the fabric. The wheel 168 is preferably canted toward the extruder head 133 in order to urge the edge of the fabric firmly into contact with the extrudate. A similar arrangement (not shown) is employed with the extruder assembly 18.

During operation of the apparatus 10, the reinforced fabric 154 is drawn between the extruder head 121 and 133 and over the smooth plates 130 and 136 which are adjusted to bring the edges 153 of the fabric into approximately the same plane of the forming edges of the wheels 129 and 135. To pull the fabric, the drawing mechanism 20, depicted in FIG. 8, is employed. The mechanism includes two rollers 170 and 171 mounted on a pair of vertical supports 172 carried by the frame 11. The lower roller 171 has a pulley 173 driven by a power belt 174 connected to a motor 175. The motor 175 is mounted by a bracket 176, itself carried by vertical support 172. Counterclockwise rotation of the roller 171 will advance the fabric 154 between rollers 170 and 171 from the support table 12. Although not detailed in the drawings, it should be understood that the rollers 170 and 171 may be adjustably spaced from each other to accommodate varying thicknesses in the fabric.

Returning to the operation of the apparatus 10, the amount of elastomer extruded to form the gum edge 180 (FIG. 7) is controlled, first, by the distance of the recess 155 from the fabric edge 153 and, secondly, by the distance between the forming edge 165 and the fabric. By positioning the wheel 135 closer to the edge of the fabric than the width of the extrudate, the elastomer is forced into exact engagement with the fabric edge contacting substantially all of the exposed surfaces thereof and particularly the reinforcement filaments, as depicted in FIG. 7. In this manner, virtually no air can become entrapped between filaments, which has in the past permitted the occurrence of some oxidation. Furthermore, total possible adherence results from the close contact of the extrudate with the fabric edge. Also, to be noted is that the edge 165 constitutes a second forming surface which imparts a second, external edge to the extrudate as it is joined to the fabric. Owing to the initial C-shaped configuration of the extruded ribbon, it is seen that a portion thereof passes over and below the fabric edge.

In addition to building up elastomer to avoid hinge points at the edges of belts and body plies, metallic reinforcement 188, either cabled or single strand, is readily encompassed by the gum edge 180 or edge of other suitable profile. The apparatus 10 is particularly useful with reinforced elastomeric fabric 154 comprising a plurality of narrow reinforced ribbons 189 severed from a continuously extruded ribbon and consecutively stitched together as may be constructed on an apparatus described in the aforementioned U.S. Pat. No. 3,803,965, the subject matter of which is hereby incorporated by reference. On such an apparatus, elastomeric fabric withdrawn therefrom will be still warm from the extruder when it is fed across the table 12 of the apparatus 10. Moreover, the severed ends of steel reinforcement need be exposed to the atmosphere for no longer than approximately one minute prior to receiving the gum edge, thus eliminating any possibility of oxidation which could give rise to subsequent edge separation of elastomer from reinforcement.

Figure 11:
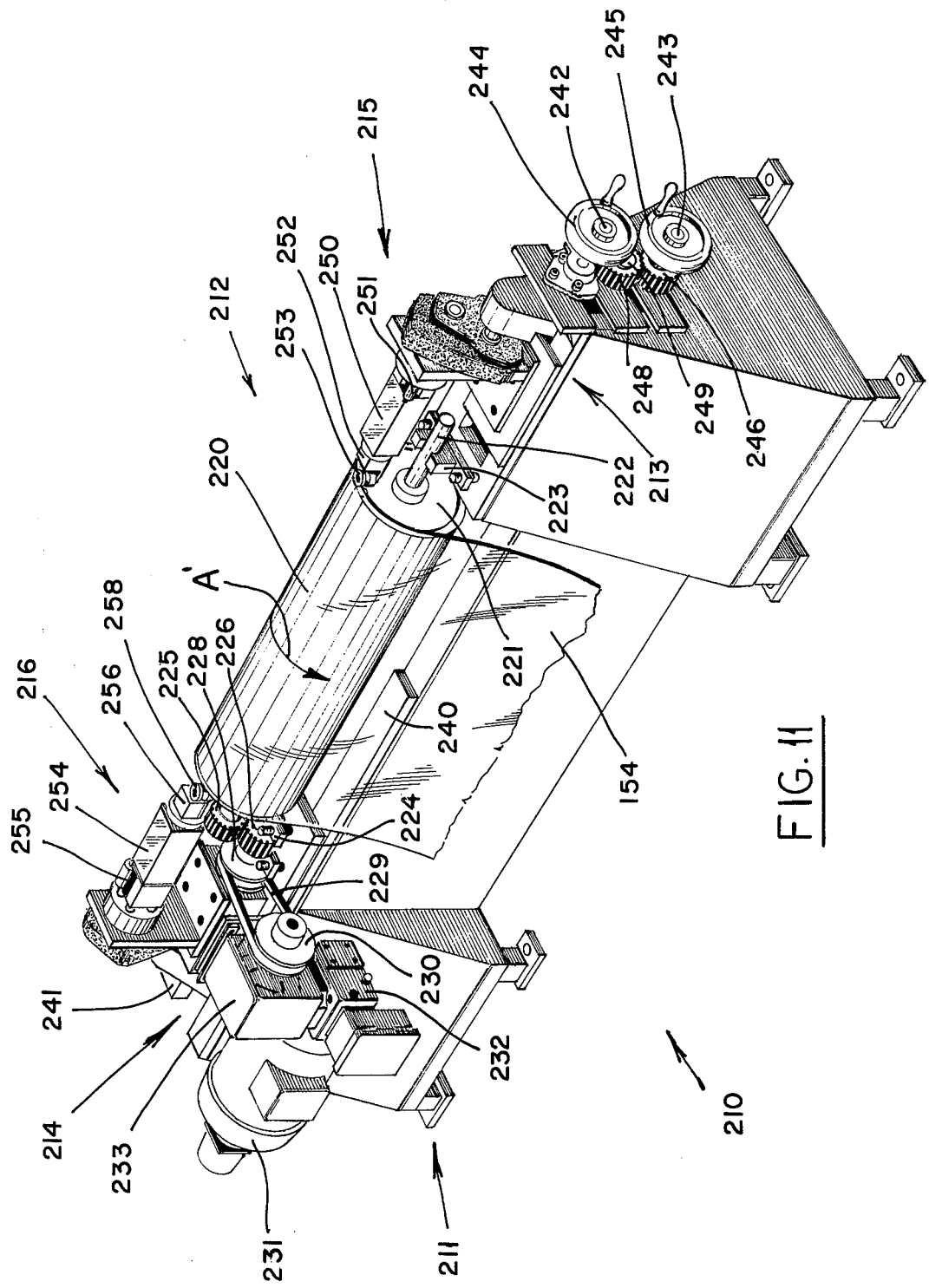
FIG. 11 is a perspective view of an alternate embodiment for edging sheets of reinforced elastomeric fabric embodying the concept of the present invention and operative according to the method thereof.

With reference now to FIG. 11, the alternate embodiment, referred to generally by the numeral 210, shall be described. The apparatus 210 has a rigid base frame 211 from which is supported the primary mechanisms, i.e., means for support of the reinforced elastomeric fabric 154, indicated by the numeral 212, inboard and outboard carriage assemblies, 213 and 214 respectively and inboard and outboard extruder assemblies, 215 and 216 respectively.

The means for support 212 comprises a cylindrical drum 220. A hub 221 is provided at each end and a drum shaft 222, affixed to the hubs and concentric with the drum 220, enables the drum to rotate. The drum shaft 222 extends beyond the length of the drum and is supported at the inboard end by a saddle 223 carried by inboard carriage assembly 213. Although the shaft could be journalled in a suitable bearing assembly, the relative lightweight of the drum and slow revolution thereof permits the use of a saddle 223 which in turn facilitates removal of the drum as described hereinbelow.

At the outboard end of the drum, the shaft 222 is also supported by a saddle 224 and is further provided with a gear 225 which in turn meshes with a drive gear 226. The gear 226 is carried on a shaft having a pulley 228 about which is reeved a drive belt 229 from a drive pulley 230. A motor 231, angle drive 232 and gear reducer 233 are provided to drive the pulley 230 for the rotation of the drum 220. During operation of the apparatus 210, the fabric 154 is passed over the drum 210 and rotation thereof enables the fabric to pass through the apparatus in the direction of the arrow A'. Although a means for rotating the drum 220 has been provided via gears 225 and 226, motor 231 and related components, it is to be understood that the fabric could be drawn through the apparatus 210 by other means such as a conventional wind-up unit (not shown and not forming a part of this invention) which draws the fabric into rolls for subsequent storage, shipment and use. Thus, the drum 220 need only be rotatable as the fabric 154 passes thereover.

The carriage assemblies 213 and 214 are similar in structure and function to the assemblies 13 and 14 described hereinabove in conjunction with the apparatus 10 and therefore, will not be discussed in detail. Basically, the inboard carriage 213 is movable toward and away from the drum 220 a short distance of 1-2 inches (2.5-5.0 cm) and reciprocal movement of the outboard carriage 214 over bed plates 240 and 241 is permissible over a greater distance, e.g., 30 inches (75 cm).

Carried within the frame 211 of the apparatus 210 are carriage shafts 242 and 243 provided with handwheels 244 and 245, respectively. Rotation of handwheel 244 reciprocates inboard carriage assembly 213 while rotation of handwheel 245 reciprocates outboard carriage assembly 214. The shaft 242 is threaded and engages a block (not shown) extending from the underside of the carriage assembly 213 for reciprocation, similar to the blocks 65 and 68 described hereinabove. The shaft 243 carries a gear 246 meshing with a gear 248 carried by outboard carriage shaft 249 which in turn threadingly engages a block (not shown) extending from carriage assembly 214. The gears 246 and 248 are employed because the carriage shafts 242 and 249 are too close together to carry the handwheels 244 and 245.

The extruder assemblies 215 and 216 are also similar in structure and function to the extruder assemblies 18 and 19 of the apparatus 10. Each has an extruder screw driven by motors (not shown) carried within the frame 211. The extruder assembly 215 includes the extruder 250, feed port 251, extruder head 252, forming wheel 253 and heating element (not shown) as does the assembly 216, having an extruder 254, feed port 255, extruder head 256, forming wheel 258 and heating element (not shown). For a detailed description of the remaining components the exclusion of the elastomeric material, the formation of a profile and the application thereof to the edge of the fabric 154, reference to FIGS. 5-7 may be made, it being understood that the extruder assemblies 18 and 19 could be directly substituted for the assemblies 215 and 216.

During operation of the apparatus 210, the extruder assemblies are moved until the forming wheels 253 and 258 are within a slight distance from the edges of the fabric 154, predetermined by the desired dimensions of the gum edges to be applied. As depicted in FIG. 11, the fabric 154 extends slightly beyond the edges of the drum 220 in order to expose all surfaces of the edge to the extrudate. In the event it is desired to edge fabrics of different widths, the drum 220 and shaft 222 can be readily removed by vertically raising the same from the saddles 223 and 224. Thereafter, another drum and shaft may be lowered onto the blocks with the gear 225 or another being affixed to the shaft if rotation of the drum be desired.

As will be appreciated by those skilled in the art, an expansible drum could be fabricated and employed in lieu of the removable drums disclosed herein, without departing from the scope of the present invention. However, the greater the simplicity of the removable drum and the reduction in the number of mechanical members attendant an expansible drum results in a more trouble-free apparatus. Of course, once the new drum size has been established and positioned, movement of the carriage assemblies 215 and 216 will readily bring the extruders into position for operation of the apparatus 210.

Thus, it should be apparent from the foregoing description of the preferred embodiment that the present invention herein described accomplishes the object of the invention. The apparatus and preferred method of operation thereof permit an edge of substantially any extrudable elastomer, compatible with that of the reinforced elastomeric fabric, to be applied to at least one and preferably two opposed edges in one pass. Owing to the manner in which the elastomer is applied, air pockets which could give rise to oxidation of steel reinforcement or discontinuities between elastomer and reinforcement are eliminated. Moreover, edges are applied in profiles heretofore impossible or at least impracticable with conventional equipment, and elastomers, more desirable but prohibitively expensive, or perhaps difficult to apply, may now be applied easily and with little or no waste.

We claim:

1. Apparatus for applying an elastomeric material against at least one longitudinal lateral edge portion of a sheet of fabric, said apparatus comprising:
   a frame;
   means mounted on said frame to support a moving piece of fabric;
   at least one extruder assembly mounted on said frame and including:
      a semi-cylindrical throat which tapers to an outlet port capable of being located laterally adjacent such a lateral edge of the fabric sheet to which the elastomeric material is to be applied; and
      a forming edge extending a substantial distance along and within said throat and terminating at said outlet port to form an internal, substantially C-shaped, surface on the extrudate emanating from said outlet port into the atmosphere; and,
   a wheel mounted in proximity to said extruder outlet port to force such an extrudate against such a lateral edge of the fabric whereby said internal surface envelopes the upper, lower and side of such a lateral edge;
   said wheel presenting a forming surface by which to impart an external surface to the extrudate, said forming surface on said wheel being positioned dimensionally closer to the edge of the fabric than the dimension of the extrudate passing therebetween.

2. Apparatus, as set forth in claim 1, further comprising:
   a forming plate mounted on said extruder assembly adjacent such a lateral edge portion of the fabric;
   said forming edge being presented from said forming plate and
   comprising a bar which causes the extrudate to turn toward said lateral edge portion of the fabric.

3. Apparatus, as set forth in claim 1, wherein said means for support comprises:
   a drum shaft carried upon said frame; and,
   a cylindrical drum rotatably carried by said drum shaft; and
   support means operatively associated with said frame for the rotational mounting of said shaft and drum thereon for facile insertion and removal thereof to accommodate various widths of fabric.

4. Apparatus, as set forth in claim 1, further comprising:
   a second extruder assembly; and
   at least one carriage assembly movable over said frame and carrying one of said extruder assemblies for movement toward and away from said other extruder assembly.

5. Apparatus, as set forth in claim 4, further comprising:
   a second carriage assembly movable over said frame and carrying said other extruder assembly.

* * * * *